United States Patent [19]

Robinson et al.

[11] 4,426,911

[45] Jan. 24, 1984

[54] ROTARY DIGITAL ELECTROHYDRAULIC ACTUATOR

[75] Inventors: Curtiss W. Robinson; Eugene T. Raymond, both of Seattle, Wash.

[73] Assignee: The Boeing Company, Seattle, Wash.

[21] Appl. No.: 117,388

[22] Filed: Feb. 1, 1980

[51] Int. Cl.[3] .......................... F15B 21/02; B64C 9/00; F01B 3/00

[52] U.S. Cl. .......................................... 91/35; 91/499; 244/75 R

[58] Field of Search ................. 91/499, 491, 492, 375, 91/361, 35; 244/75 R, 225, 228

[56] References Cited

U.S. PATENT DOCUMENTS

| | | | |
|---|---|---|---|
| 2,964,014 | 12/1960 | Quintard | 91/375 |
| 3,056,387 | 10/1962 | Bodzick | 91/35 |
| 3,075,504 | 1/1963 | Vogel | 91/491 |
| 3,112,902 | 12/1963 | Kungelbuck | 244/14 |
| 3,301,269 | 1/1967 | Marwood | 137/30 |
| 3,347,041 | 10/1967 | Bahnruh | 91/375 |
| 3,361,059 | 1/1968 | Hunter | 91/499 |
| 3,548,715 | 12/1970 | Bobst | 91/499 |
| 3,640,183 | 2/1972 | Roch | 91/361 |
| 3,736,488 | 5/1973 | Abraham et al. | 318/676 |
| 3,744,377 | 7/1973 | Lauch | 91/499 |
| 3,961,558 | 6/1976 | Dorukin et al. | 91/491 |
| 4,066,002 | 1/1978 | Eastman | 91/492 |
| 4,180,222 | 12/1979 | Thornburg | 244/75 |

FOREIGN PATENT DOCUMENTS

| | | | |
|---|---|---|---|
| 2247005 | 5/1975 | France | 91/35 |

*Primary Examiner*—William L. Freeh
*Attorney, Agent, or Firm*—Delbert J. Barnard; Eugene O. Heberer; Joan H. Pauly

[57] ABSTRACT

An electric stepping motor, operated by command pulses from a computer or microprocessor, rotates a rotary control member of a distributor valve, for sequencing hydraulic pressure and flow to the cylinders of one or more axial piston hydraulic motors. A group of the cylinders are subjected to pressure and flow and the remaining cylinders are vented to a return line. Rotation of the rotary control member sequences pressurization by progressively adding a cylinder to the forward edge to the pressurized group and removing a cylinder from the trailing edge of the pressurized group. The pistons of each new pressurized group function to rotate a wobble plate into a new position of equilibrium and the hold it in such position until another change in the makeup of the pressurized group. An increment of displacement of the rotary hydraulic motor occurs in direct response to each command pulse that is received by the stepping motor. In an installation which includes two hydraulic motors connected to a common output, the rotary distributor valve functions to alternate driving pulses of hydraulic pressure and flow between the two motors.

15 Claims, 10 Drawing Figures

ROTARY DIGITAL ELECTROHYDRAULIC ACTUATOR

GOVERNMENT INTEREST

The Government has rights in this invention pursuant to Contract No. F33615-77-C-2034 awarded by U.S. Air Force.

BACKGROUND OF THE INVENTION

1. Field of the Invention

This invention relates to rotary electrohydraulic actuators suitable for use in positioning control surfaces of an aircraft. More particularly, it relates to the provision of a rotary incremental electrohydraulic actuator that is capable of being directly controlled by digital input signals from a computer or microprocessor, digital to analog coversion components are not required.

2. Description of the Prior Art

Conventional systems for positioning control surfaces of an aircraft normally utilize a valved ram or valved rotary hydraulic motor type actuator. A disadvantage of these systems is that the valved hydraulic ram or motor cannot adapt its power consumption to load demands and must dissipate large amounts of hydraulic power across the orifices of its control valve whenever a high rate with less than maximum output force or torque is demanded. A second disadvantage of such systems is that they require a feedback to insure adequate dynamic response and as a result are susceptible to a hardover reaction of the output in the event of a loss of the feedback signal continuity.

There are some flight control surface actuators in existance which have power conserving properties when used on dynamically active surfaces. However, under static output conditions, these systems waste power by keeping a variable displacement pump in constant rotation at a high rotational speed.

Present trends of aircraft actuation systems are toward electrically controlled hydraulic actuators. Centrally located on-board digital computers or dispersed individual microprocessors are foreseen to provide the command signals to these actuators. Present state-of-the-art actuators and controls are analog type devices that require digital to analog conversion components to be compatible with the digital electric control signals.

SUMMARY OF THE INVENTION

According to the present invention, an electric stepping motor, operable by an incremental command signal, is used to operate a rotary distributor valve which serves to control the flow of hydraulic fluid to and from a rotary hydraulic power unit, e.g. a motor. The rotary hydraulic power unit comprises a plurality of piston-cylinder units and means that is operable in response to sequenced pressurization of the piston-cylinder units, and attendant piston movement, to apply rotational torque to an output member. The output shaft of the stepping motor is connected to a rotary port control member which when rotated opens and closes ports to control the distribution of hydraulic fluid to and from the piston-cylinder units. During operation, a group of the piston-cylinder units are in communication with hydraulic pressure and the rest are vented to a return line. Stepping motor rotation of the rotary control member sequences pressurization by progressively adding a cylinder to the forward edge of the pressurized group and then removing a cylinder from the trailing edge of the pressurized group, to in that manner deliver driving pulses of hydraulic fluid to the rotary hydraulic power unit. Each group of pressurized piston-cylinder units functions to drive the output of the rotary hydraulic power unit to a distinct bottom-dead-center position and then hold it in such position until another change is made in the makeup of the pressurized group. Owing to this arrangement, an increment of rotary displacement of the output member of rotary hydraulic power unit occurs in direct response to each command pulse that is received by the stepping motor.

Accordingly a principal object of the present invention is to provide an electrohydraulic transducer which will provide an output incremental displacement or movement for each electrical pulse transmitted from a computor or microprocessor.

An advantage of this type of system is that the rotary hydraulic power unit demands hydraulic flow and power only when a change in output position is commanded and demands power only in proportion to the magnitude of the output load or torque. One form of the invention uses an acutator unit in the form of an axial piston motor having a fixed cylinder block in which the cylinders of the piston-cylinder units are in a ring surrounding a centerline which is parallel with the pistons. Such motor comprises an output shaft having an axis of rotation which is co-axial with the cylinder block centerline and a swash plate connected to the output shaft. The pistons of the piston-cylinder units each have a load bearing end which in contact with the swash plate and arranged so that axial displacement of the pistons will apply a rotational torque to the swash plate and in turn to the output shaft.

According to another aspect of the invention, the actuator may include a second axial piston motor of the same type which is parallel to the first motor, and torque summing gearing means connecting the drive shafts of the two motors to a common rotary output member. The distributor valve may be adapted to alternate driving pulses of hydraulic pressure between the two motors.

The stepping motor, the rotary distributor valve and the hydraulic power device are all reversible.

The hydraulic power device is reversible also in a power sense in that a reversal of output torque causes it to switch from the action of a motor to that of a pump, causing the system to regenerate power to its hydraulic power source.

According to an aspect of the invention, an output of the hydraulic power device is connected to a flight control surface of an aircraft and such device is controlled by an onboard digital computer or microprocessor.

These and other objects, advantages and features of the present invention are evident from an embodiment of the invention which is illustrated by the drawings and described in detail below.

BRIEF DESCRIPTION OF THE DRAWING

In the drawing like element designations refer to like parts, and.

DESCRIPTION OF THE PREFERRED EMBODIMENT

Figure 1:
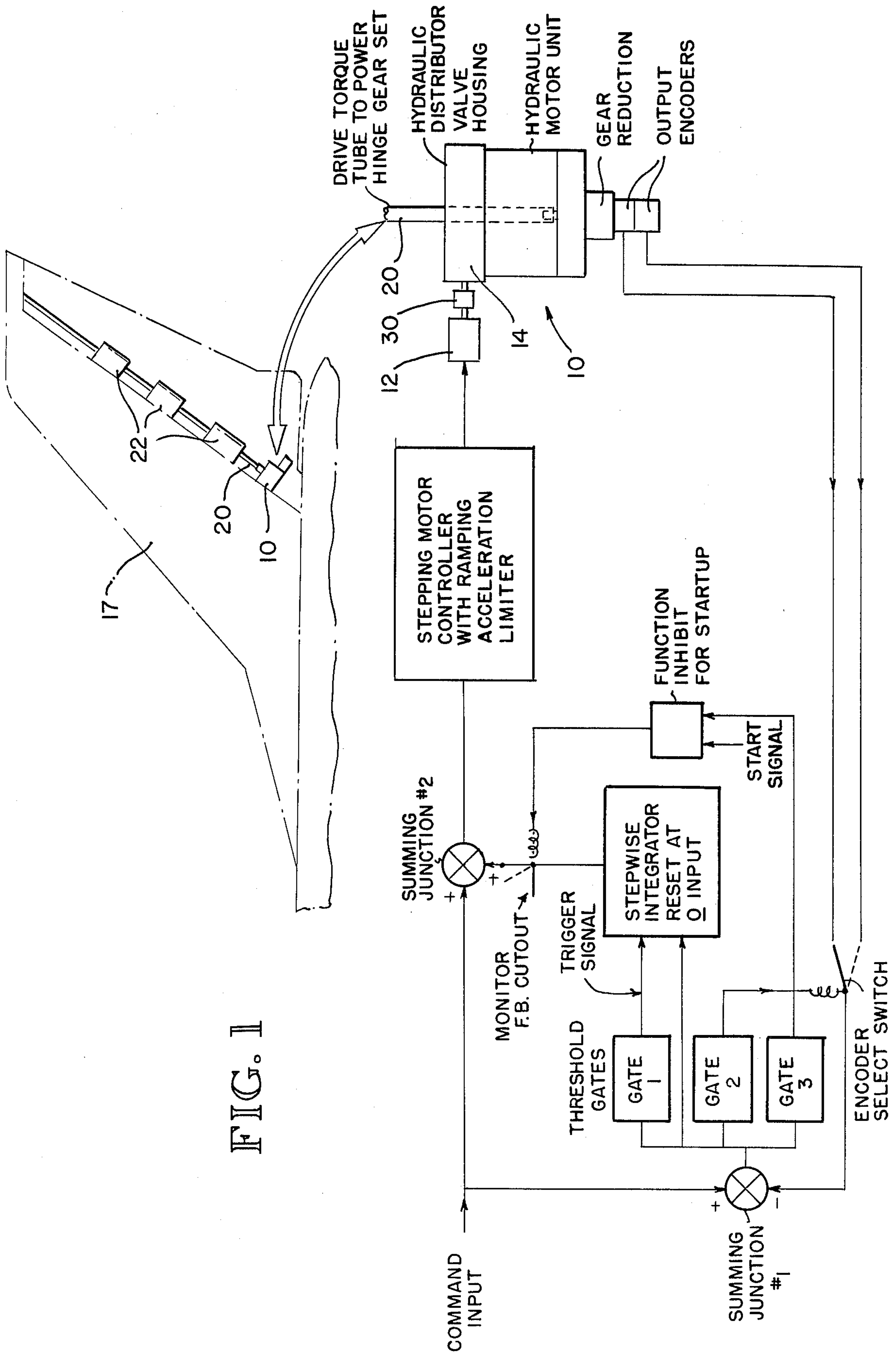
FIG. 1 is a diagram of an actuator embodying the invention, such diagram including a schematic of a monitor circuit and showing a typical use of the actuator in an aircraft.

Referring first to FIG. 1, the illustrated embodiment is an electrohydraulic actuator 10 comprising a reversible stepping motor 12, a distributor valve 14 and a hydraulic motor 16.

Figure 3:
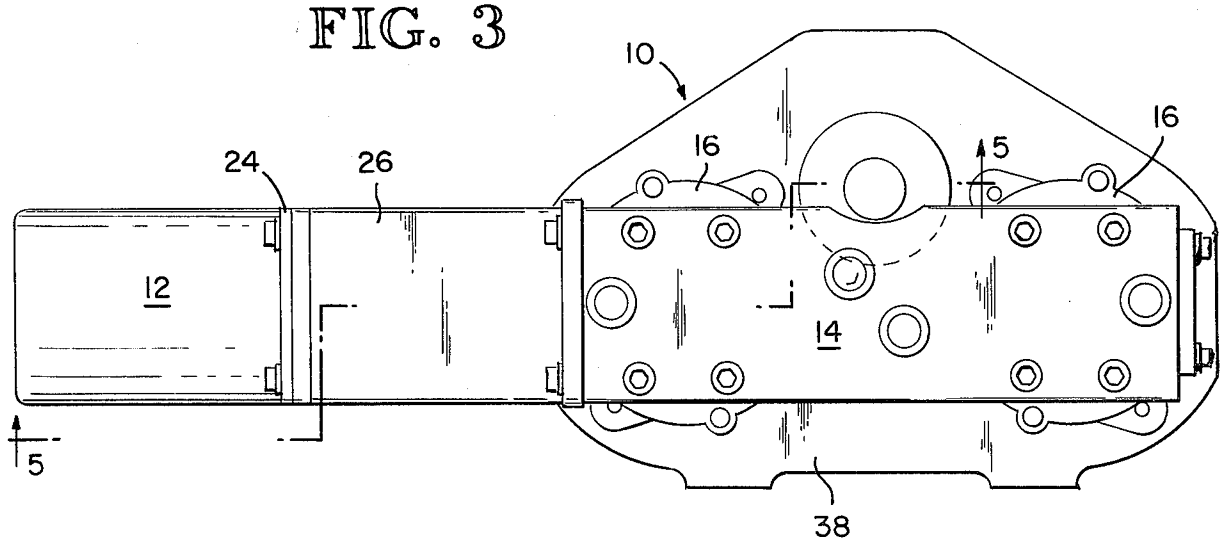
FIG. 3 is a plan view of an embodiment of the invention.
Figure 5:
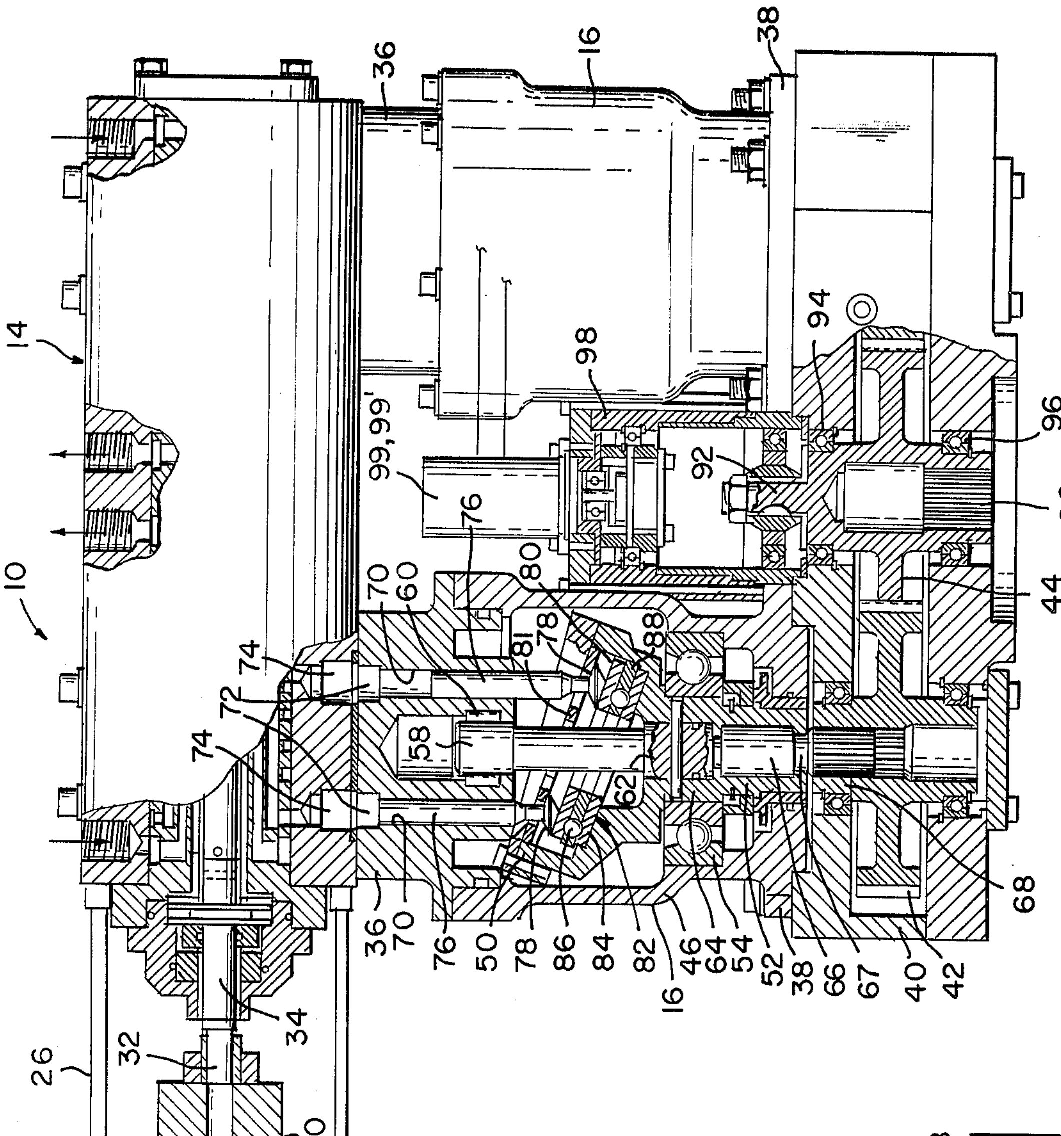
FIG. 5 is a view partially in elevation and partially in section, the section being taken substantially along line 5—5 of FIG. 3.
Figure 4:
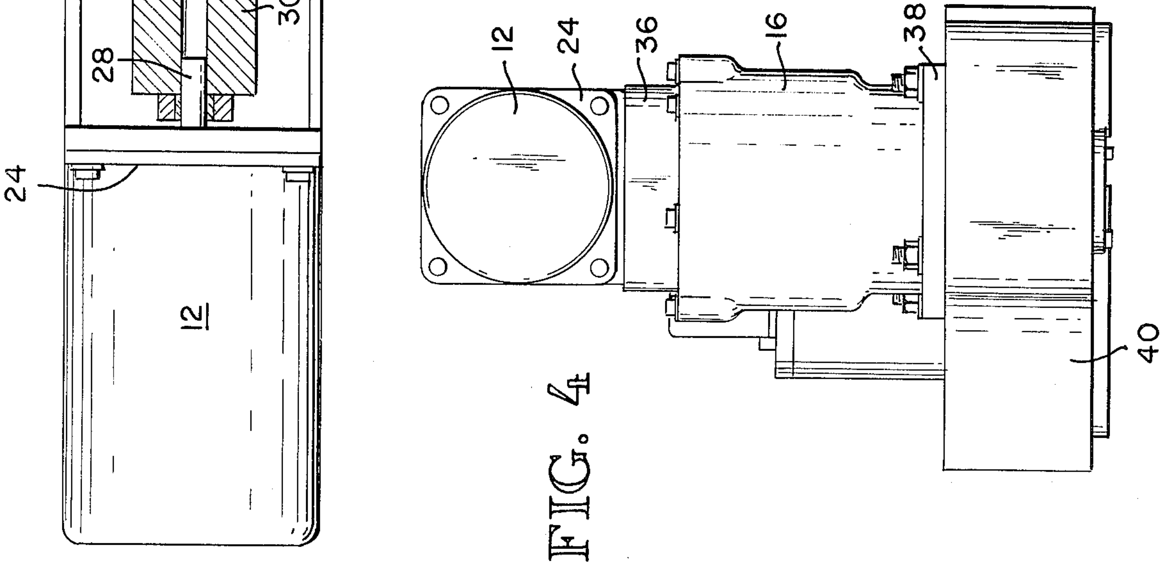
FIG. 4 is an end elevational view of the embodiment shown by FIG. 3.

As shown by FIGS. 3, 4 and 5, the components of the actuator 10 may be connected together to form a relatively compact package. FIG. 1 shows the actuator 10 mounted within a lower portion of an aircraft fin 17, coupled to a torque tube 20 which applies a driving torque to power hinge gear reduction units 22 for moving the aircraft rudder 18 from side-to-side.

As best shown by FIG. 5, the stepping motor housing 24, may be connected to the end of a coupler housing 26 in which the output shaft 28 of the stepping motor 12 is coupled by a coupler 30 to the drive end 32 of the rotary control member or spool 34 of the distributor valve 14. Housing 26 is shown controlled to one end of the distributor valve housing.

The embodiment shown by FIGS. 3–5 comprises a pair of rotary hydraulic motors 16 in a side-by-side relationship. A first end 36 of each motor housing is connected to one side of the distributor valve housing. The opposite ends 38 of the hydraulic motor housings are connected to a housing 40 for torque summing gears 42, 44 as will hereinafter be described in greater detail.

The hydraulic motors 16 are basically alike, so only one will be described in detail.

Referring to FIG. 5, each hydraulic motor housing comprises a main section 46 in which a wobble plate structure 48 is mounted for rotation. Wobble plate structure 48 may comprise a canted bell-end 50 and an axially extending end in the form of a hollow shaft 52 which is mounted for rotation by means of a ball bearing 54. A stabilizing shaft 58 may extend from the shaft 52, through the bell 50, and be journaled for rotation at its free end 58 by means of a roller type radial bearing 60 housed within the end portion 36 of the motor housing. The fixed end 62 of shaft 58 may be snuggly received within the hollow interior of shaft 52 and be secured to the shaft 52 by means of a cross-pin 64. The opposite end of shaft 52 may include internal spline grooves for receiving a splined first end portion 66 of a short shaft 67. Shaft 67 is shown to have splins 68 at its opposite end which mate with internal splines formed within a tubular hub portion 70 of a gear 42.

Housing end member is formed to include a plurality of parallel bores 70 which constitute the cylinder portions of a plurality of piston-cylinder units. The cylinders 70 have combined inlet-outlet port 72 at their outer ends which are matched with ports 74 formed in a bottom portion of the distributor valve housing.

Cylinders 70 are parallel to each other and to the axis of rotation of the wobble plate structure 48. A piston 76 is supported for reciprocating axial movement within each cylinder 70. The inner ends of pistons 76 are preferably formed to include headed load bearing ends 78 which are adapted to make contact with the uper race 80 of a bearing assembly 82. The opposite sides of the heads are adapted to be contacted by portions of a plate 81 which serves to return the pistons. Plate 81 is secured to bell 50. Bearing assembly 82 may comprise upper and lower races 80, 84, a plurality of ball-type antifriction elements 86 sandwiched between the races 80, 84, and a retainer 88 for the antifriction elements 86.

In a manner to be hereinafter described in detail, stepper motor rotation of the valve spool 34 open and close ports in distributor valve 14 which conrol the flow of hydraulic fluid to and from the cylinders 70 of the hydraulic motors 16.

The drive gears 42 mesh with and drive an output gear 44. Gear 44 is shown to have a drive connection at each of its ends. Internal spline grooves 90 are formed at one end; the second end includes a stub shaft 92 which is connected to the input of a gear reducer which is a part of a monitor system for the command input.

Gear 44 may be mounted for rotation by a pair of spaced apart bearings 94, 96.

As will hereinafter be described in detail the distributor valve 14 includes what may be considered to be a plurality of on-off valves for each cylinder 70 of each hydraulic motor 16. During operation, approximately one half of the cylinders 70 are pressurized at any given time, with the remainder of the cylinders 70 being vented. In the illustrated embodiment, wherein the hydraulic power devices 16 are hydraulic motors, the vented cylinders 70 are vented to return pressure.

The sequence of pressurization of the cylinders 70 of a single six piston-cylinder unit hydraulic motor may be diagramed as follows:

Six Cylinder Sequence of Pressurization

| | | | | | | | |
|---|---|---|---|---|---|---|---|
| 1 | 2 | | | | | | |
| 1 | 2 | 3 | | | | | |
| | 2 | 3 | | | | | |
| | 2 | 3 | 4 | | | | |
| | | 3 | 4 | | | | |
| | | 3 | 4 | 5 | | | |
| | | | 4 | 5 | | | |
| | | | 4 | 5 | 6 | | |
| | | | | 5 | 6 | | |
| | | | | 5 | 6 | 1 | |
| | | | | | 6 | 1 | |
| | | | | | 6 | 1 | 2 |

Diagram I.

The sequence of pressurization illustrated by this diagram is of a type which progresses first by adding a cylinder to the forward edge of the pressurized group and then removing a cylinder from the trailing edge of the pressurized group. The numbers used in the diagram are order numbers of the piston-cylinder units 76, 70.

In the illustrated embodiment, the distributor valve 14 interweaves the sequence of pressurization of the cylinders 70 of the two motors 16. In other words, a cylinder 70 is added to the forward edge of the pressurized group of the first motor 16, then a cylinder 70 is removed from the trailing edge of the pressurized group of the second motor 16, then a cylinder 70 is added to the forward edge of the pressurized group of the second motor 16, and then a cylinder 70 is removed from the trailing edge of the pressurized group of the first motor 16, etc. This sequence of pressurization may be digramed as follows:

Twelve Cylinder Sequence of Pressurization

| | | | | | | | | | | | |
|---|---|---|---|---|---|---|---|---|---|---|---|
| 1 | 1' | 2 | 2' | 3 | | | | | | | |
| 1 | 1' | 2 | 2' | 3 | 3' | | | | | | |
| | 1' | 2 | 2' | 3 | 3' | | | | | | |
| | 1' | 2 | 2' | 3 | 3' | 4 | | | | | |
| | | 2 | 2' | 3 | 3' | 4 | | | | | |
| | | 2 | 2' | 3 | 3' | 4 | 4' | | | | |
| | | | 2' | 3 | 3' | 4 | 4' | | | | |
| | | | 2' | 3 | 3' | 4 | 4' | 5 | | | |
| | | | | 3 | 3' | 4 | 4' | 5 | | | |
| | | | | 3 | 3' | 4 | 4' | 5 | 5' | | |
| | | | | | 3' | 4 | 4' | 5 | 5' | | |
| | | | | | 3' | 4 | 4' | 5 | 5' | 6 | |
| | | | | | | 4 | 4' | 5 | 5' | 6 | |
| | | | | | | 4 | 4' | 5 | 5' | 6 | 6' |
| | | | | | | | | | | | etc. |

Diagram 2

In this diagram the plain numbers denote the cylinders of the first motor 16 and the prime numbers denote the cylinders of the second motor 16.

If for some reason one of the hydraulic motors 16 should malfunction and the other motor 16 continues to operate, the sequence of pressurization of the illustrated embodiment would take the character of a sequence of pressurization of a single motor, such as illustrated by diagram one above. Of course, the time interval between steps of operation of the actuator would be twice as long if only one motor 16 was operating in response to a constant stepping rate command.

In a system of this invention there is no accumulation of error which would result in a "hard over" condition because any error is associated with only one "step" of the mechanism. The stepping motor 12 drives the distributor valve 14 one step at a time. The movement of valve 14 which results in a cylinder being added to the forward edge of the pressurized group involves the distributor valve 14 functioning to open a passageway leading from the source of pressurized fluid to the added cylinder. When this happens the pressurized fluid which is communication with the added cylinder pressurizes the piston within such cylinder. Pressurization of the piston applies a rotational torque on the swash plate structure 48, causing it to rotate until the group of the pressurized pistons reach a position where their combined torque output equals the load torque. At that time there will be a condition of equilibrium and the wobble plate 48 will stop rotating. The forces imposed on the wobble plate 48 by the pistons of the pressurized cylinders will act to hold the wobble plate 48 in the equilibrium position and it will remain in such position until another cylinder removed from the trailing edge of the pressurized group, to produce an additional increment of rotational torque acting on the wobble plate structure 48.

An important characteriztic of the present invention is that the hydraulic motor(s) does not include a valving mechanism for controlling the distribution of pressure to its (their) cylinders of a type which is controlled by the rotational position of the output shaft. Rather, the sequence of pressurization is controlled by the distributor valve 14 and the position of valve 14 is determined by an input signal which is independent of the position of the output shaft of the motor. This results in a power saving because the system will react so as to draw only power which is proportional to the applied load torque.

Figure 2:
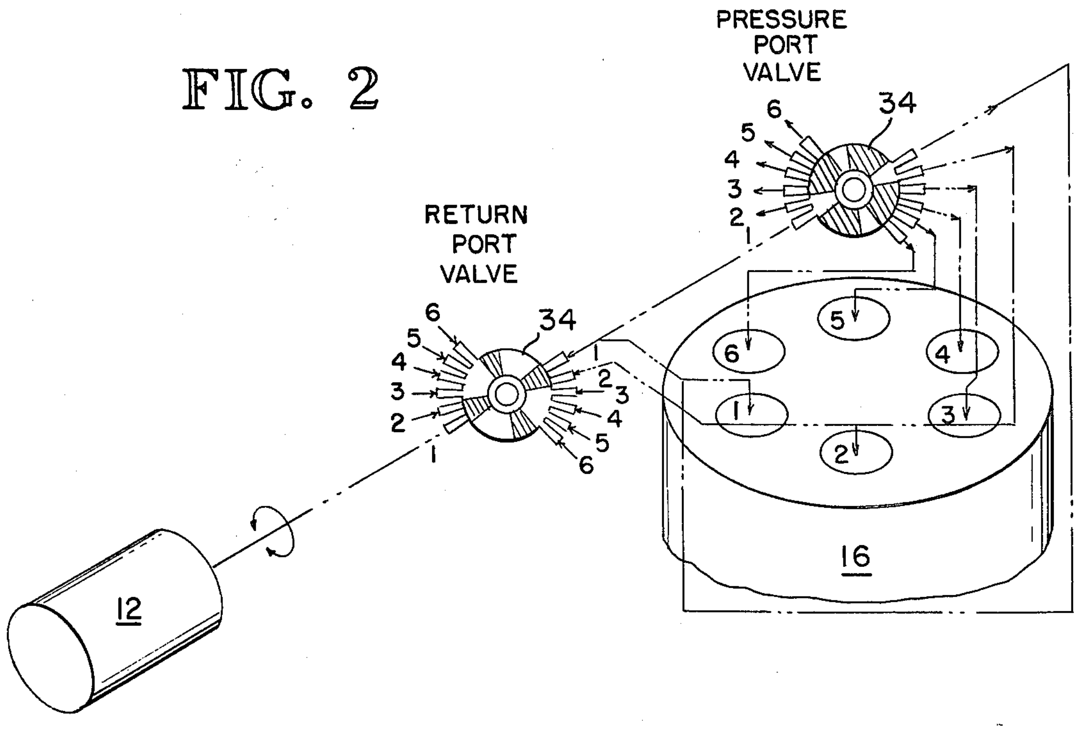
FIG. 2 is an isometric diagramatical view of three princiapl components of the actuator.

The splines 90 of gear 44 engage complementary splines at the end of a shaft portion of the mechanism that is powered by the actuator, e.g. torque tube 20 of the aircraft rudder actuating mechanism shown by FIG. 2 of the drawing.

Output shaft 92 is connected to a gear reduction set 98 which in turn is connected to and drives a shaft encoder(s) 100 which is (are) a part of the monitor feedback system. (FIG. 1).

Referring to FIG. 1, in operation of the monitor feedback circuit an error is generated at summing junction #1 between the input command and the output surface or encodor shaft position. This error is compared to each of several fixed magnitude gate values. When the first gate value is exceeded a train of corrective pulses or steps, whose sum is equal to the magnitude of the first gate error threshold, is added to the system command at summing junction #2. This train of corrective pulses is input at a limited rate and serves to bring input and output functions into synchronization at the time of system start up and to correct errors or missed steps which occur for any reason. Comparison of error with a second and larger gate threshold at gate 2 is used to switch the monitor feedback function from one output encoder 100 to a second standby unit. A third and still higher error threshold level at gate 3 is used to disable the error correcting function altogether, causing the unit to revert to operation as an open-loop stepping motor without feedback error correction.

Known feedback systems are "high gain" closed loop systems. In the event of a failure of the feedback continuity, the flight control surface or other driven element that is being actuated by the conventional actuator would slam hard over to a stop position. If the monitor system of the present invention were to fail, the driven element would not slam hard over. It would move over but slowly, causing the monitor system to disconnect the error correcting feedback function. The pilot would have sufficient time to detect that something was wrong and correct it by manually trimming out whatever positional error was present at the control surface.

The device of this invention (less the monitor feedback circuit) may have application as a variation displacement hydrostatic motor transmission for traction vehicles. The electric motor driven valve and hydraulic motor unit is power reversable as well allowing easy recovery and storage of hydraulic power from an overriding load with the recovered energy stored in a gas loaded hydraulic accumulator situated between the prime hydraulic power source and the traction unit motor transmission. Such a unit enables a heavy vehicle to store braking energy on downhill travel or on level road deceleration.

A similar application of this power saving capability can be made to machine tool carriage drives where a large mass must be accelerated and decelerated repeatedly in a controlled cycle. A hydraulic drive motor of this type allows energy to be recovered from each deceleration cycle of the load mass and for this energy to be reapplied to the next acceleration of the load in the following cycle.

The controlled hydraulic drive of the rollers of a steel mill present a similar opportunity for a substantial saving of power. The most common hydraulic drive of rolling mill rollers in present use employs a power reversable hydraulic servo incorporating variable displacement controls on both hydraulic pump and motor. This makes it necessary to control output roll velocity and position by modulation of motor torque with high gain feedback of both roll velocity and position information. The device of this invention can control either output position or velocity by the repetition of its input stepping motor command.

FIG. 2 is a diagram of a porting sequence for a single six cylinder hydruaulic motor. In this figure the valve ports in both the pressure and return sections of the valve have been given the same numbers as the associated cylinders of the hydraulic motor. The sequence of pressurization is as set forth in diagram I above. Such sequence can be determined from FIG. 2 by visualizing a step-by-step rotation of the valve port control member 98.

Figure 6:
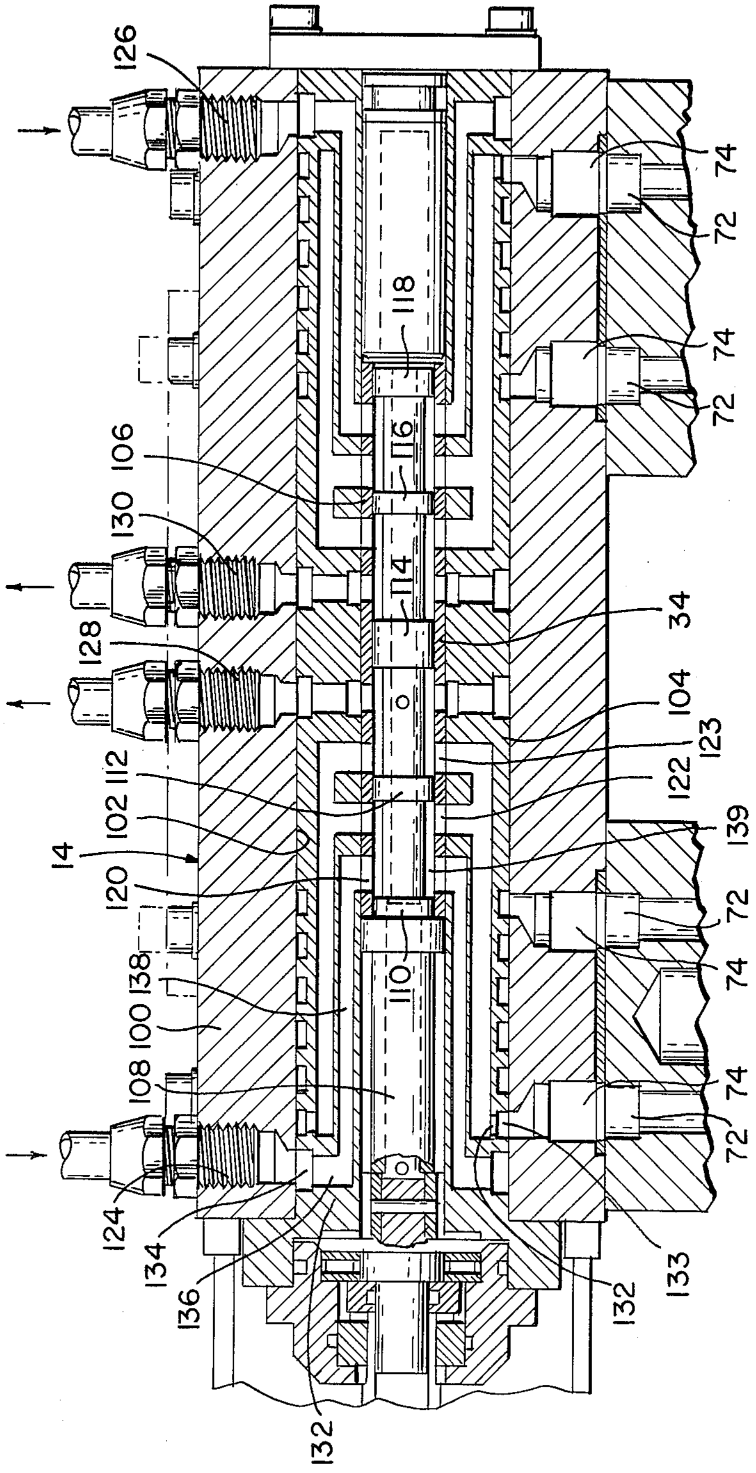
FIG. 6 is an enlarged scale axial sectional view taken through the valve assembly of the embodiment of FIGS. 3-5.
Figure 8:
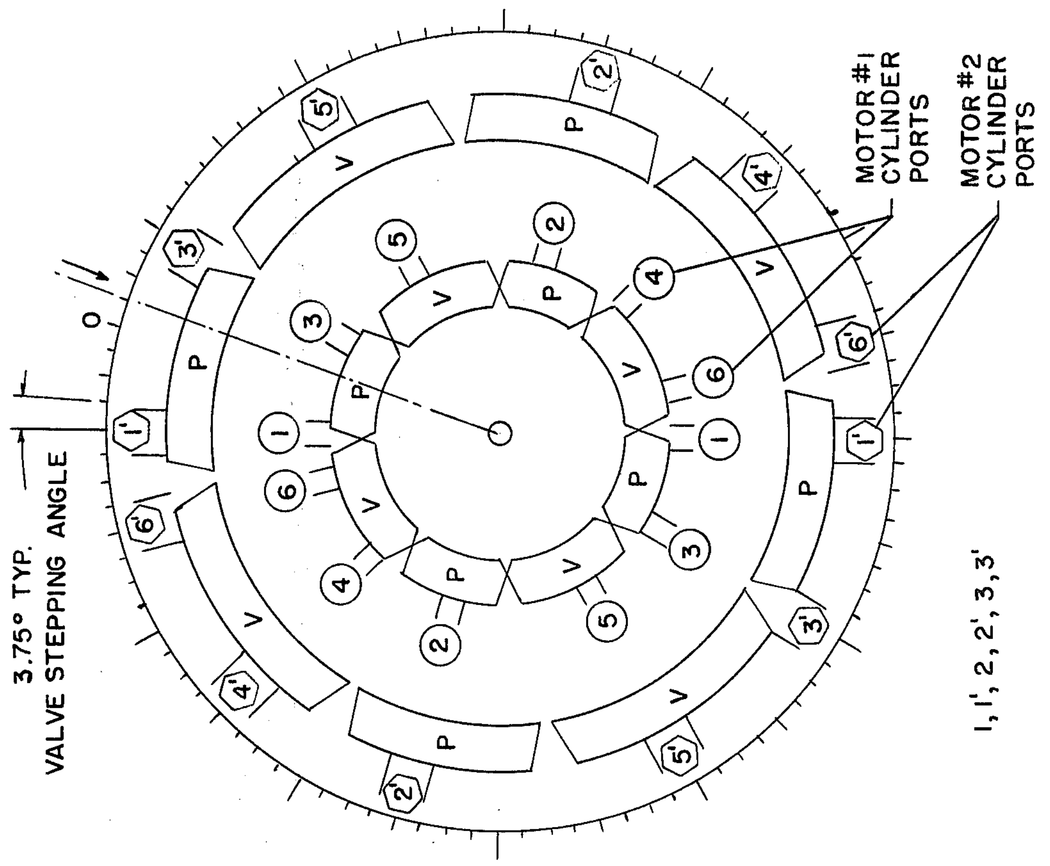
FIGS. 7-10 are diagramatical views of four sucessive stages of the porting sequence of the valve shown by FIG. 6.
Figure 7:
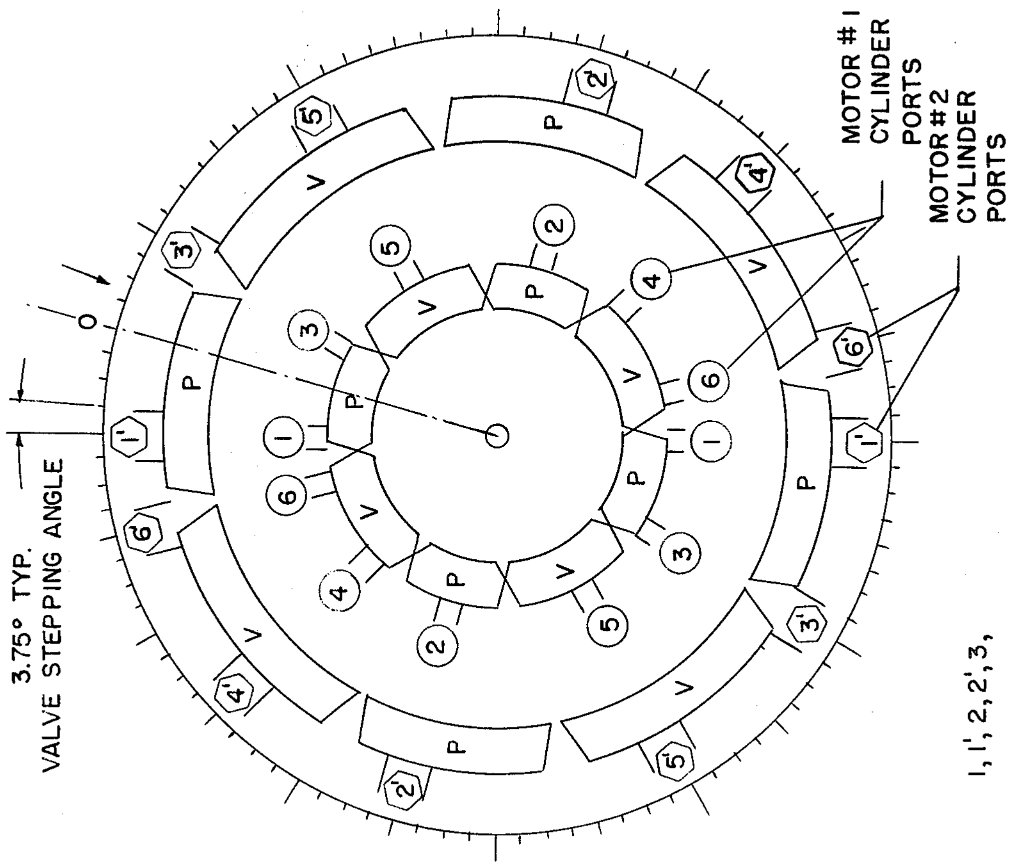
Figure 10:
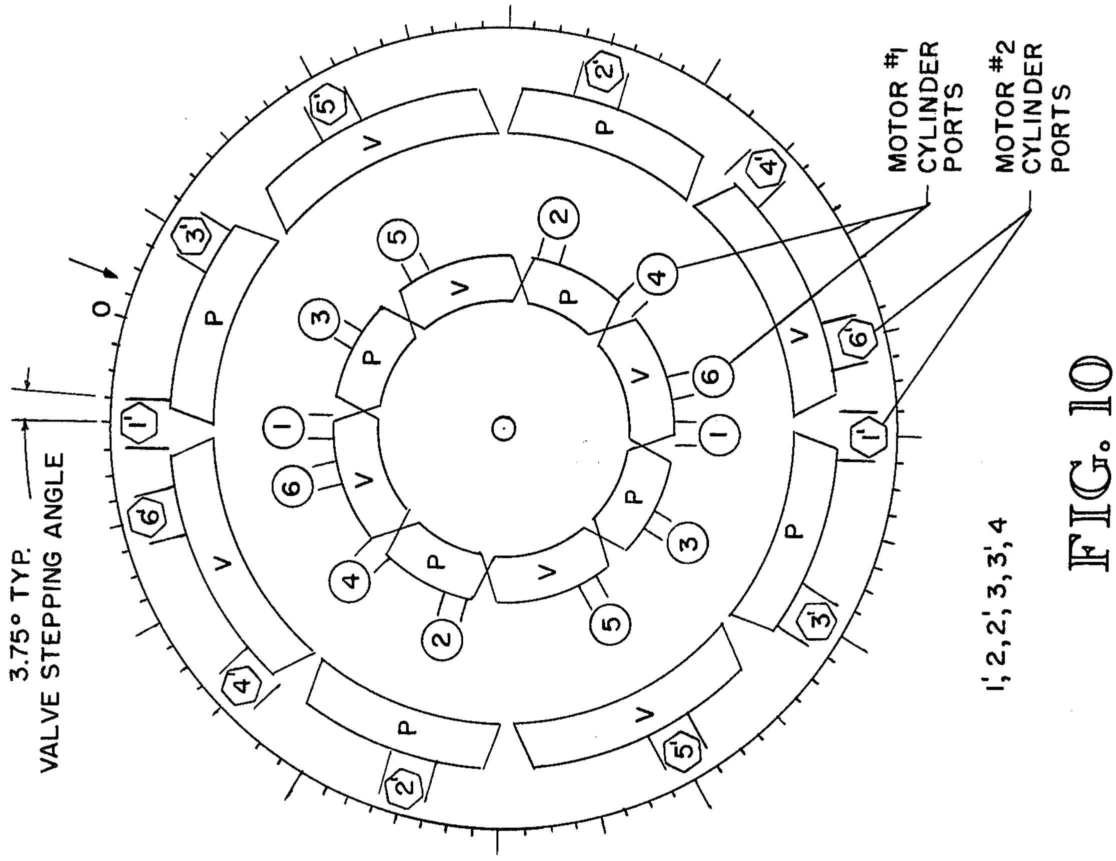
Figure 9:
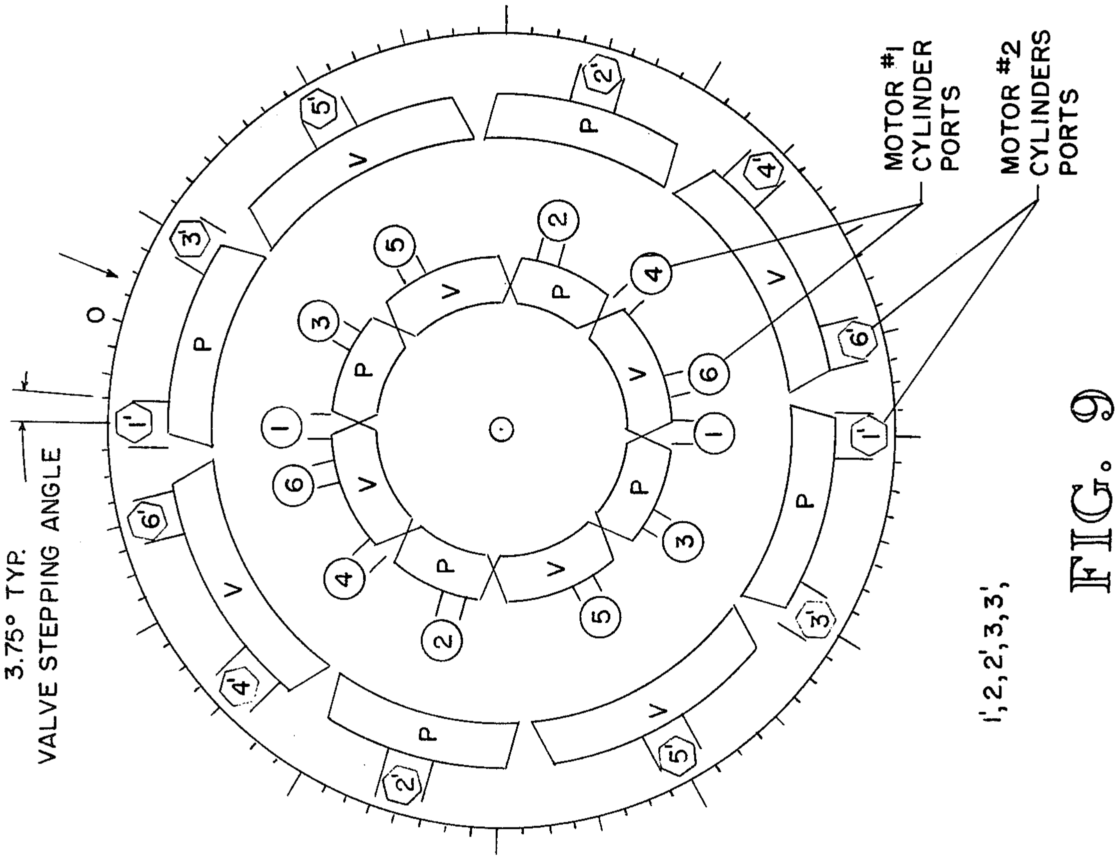

Referring to FIG. 6, the distributor valve 14 for the illustrated embodiment comprises a housing or block 100 which includes an elongated bore 102 in which a valve port insert 104 is snugly received. Insert 104 does not rotate but rather is fixed in position relative to the housing 100. Insert 104 includes an open center in which the rotating port control member 34 is received. Port control member 34 is of a composite construction. It comprises a tubular sleeve 106 and a spool assembly 108 housed within the sleeve 106. Spool assembly 108 includes a plurality of lands 110, 112, 114, 116 and 118 which form "dams" for the ends of annular chambers which are defined between adjacent pairs of lands. Radial openings or ports, some of which are designated 120, 122 123 in FIG. 6, are formed in and spaced along and about the side wall of sleeve 106. The valve housing 100 is formed to include inlet ports 124 and 126 in communication with hydraulic system pressure aboard the aircraft and outlet ports 128 and 130 which are in communication with the return line of the hydraulic system. The insert 104 is formed to include a plurality of elongated axial passageways, one for each cylinder of each hydraulic motor 16. Each passageway includes a radial port which is in position to become aligned with side wall port 122, 123 within sleeve 106 of the valve port control member 34. Each axial passageway communicates via another radial port (one of which is designated 132, for example) with an annular groove or channel (one of which is designated 133, for example) which extends around the periphery of insert 104. Each such groove or channel is communicated via a port 74 with one of the inlet-outlet ports 72 of a hydraulic motor 16.

As shown by FIG. 6, hydraulic pressure from inlet port 124 is communicated via annular passage way 134 and radial ports 136 to an annular chamber 138. Pressure within chamber 138 is communicated via ports 120 with a chamber 139 that is defined within sleeve 106, about the spool member 108, between the lands 110, 112. The pressure within such chamber 139 is sequenced to the cylinders of the hydraulic motor 16 on the left (as pictured in FIG. 5) as the control member 34 rotates and the radial ports 120 in sleeve 106 are moved into and outfrom registery with the radial inlets for the axial passageways [e.g. passage 141 in FIG. 6] in the insert which are associated with the cylinders. Control member rotation also communicates the passageways with the return port 128 via the ports 123 in member 106.

The right side of valve 14 is similarly constructed and functions to sequence pressure and flow to the motor on the right (as pictured in FIG. 5).

By way of typical and therefore nonlimitive example, the insert 104 may be constructed from sections which are connected together and machined. For example, the sections may be in the nature of a large number of discs which are joined together end-to-end. Openings and slots may be formed in the discs so that when all the discs are connected together the openings and slots will define the above described axial passageways and radial ports.

The ports and passageways are duplicated on diagramatically opposite sides of the distributor valve 14 so that the pressures acting on the machanical parts will be balanced. The sequence of pressurization is determined by the positioning of the radial ports in the rotating sleeve member 106 relative to the radial ports leading to and from the passageways within insert 104. This particular positioning is diagramatically illustrated by FIGS. 7–10 which show the positions of the ports in the rotating sleeve 106 member relative to the ports in the fixed insert member 104 during port consecutive increments or bits of rotation of the rotary control member 34. In these diagrams the porting relationship to the first motor 16 (shown on the left in FIG. 5) is shown inside of the porting relationship for the motor. The cylinder numbers used in these diagrams are the same cylinder identification numbers which are used in diagram II above. In FIGS. 7–10 the rotating ports which are in communication with system pressure are identified by the letter P and the ports which are in communication with the return line are identified by the letter V, for "vent". FIGS. 7–10 also show the duplication of ports diametrically across the valve for the purpose of balancing forces on the valve member.

From FIGS. 7–10 determine the pressurization sequence for a full 360° rotation by visualizing or plotting successive additional increments or bits or rotation of the P and V ports relative to the numbered cylinder ports. As will be appreciated, the resulting pressurization sequence will correspond with the pressurization sequence that is set for the in diagram II above. FIGS. 7–10 include a number identification of the pressurized group of the type used in Diagram II.

It is to be understood that the number of cylinders and the number of hydraulic motor units which may be used together are variables. In another installation, for example, it might be advantageous to use a single motor having nine cylinders and involving a Sequence of pressurization as follows:

| | | | | | |
|---|---|---|---|---|---|
| 1 | 2 | 3 | | | |
| 1 | 2 | 3 | 4 | | |
| | 2 | 3 | 4 | | |
| | 2 | 3 | 4 | 5 | |
| | | 3 | 4 | 5 | |
| | | 3 | 4 | 5 | 6 |
| | | | 4 | 5 | 6 |
| | | | | | etc. |

The particular construction of the motor section 16 and the particular construction of the distributor valve 14, which have been illustrated and described, are per se not parts of the present invention. They have been illustrated and described because they are parts of the best mode or presently known preferred embodiment. In other installations these, as well as other components of the invention, can vary in form from what has been illustrated and described. The illustrated form of the distributor valve 14 was designed by the Bendix Corporation, a supplier for the Boeing Company. Aero Hydraulics, Inc. of Ft. Lauderdale, Fla., a subsidiary of the Garrett Corporation, and also a supplier of The Boeing Company, designed the particulars of the illustrated form of motor section 16. The particular porting sequence that is disclosed is a part of the invention.

What is claimed is:

1. A rotary incremental electrohydraulic actuator, comprising:

an electric stepping motor operable by electrical command pulses and including a rotary output shaft which rotates an angular increment in response to each electrical command pulse received by said electrical stepping motor;

a pair of rotary output hydraulic motors, each having an output shaft;

a rotary output member;

torque summing gearing means connecting the output shafts of the hydraulic motors to said rotary output member;

each hydraulic motor comprising a plurality of cylinders, a fixed cylinder block in which the cylinders are in a ring surrounding a center line, pistons within said cylinders, said pistons and said cylinders extending parallel to the center line, and means for providing rotational torque to the output shaft of the motor, comprising a wobble plate connected to the output shaft, load bearing ends on the pistons which are in contact with the wobble plate, whereby axial movement of the pistons will apply a rotational torque to the wobble plate and to the output shaft connected thereto;

distributor valve means including a rotary control member connected to and rotated by the output shaft of the electric stepping motor, and port means controlled by rotation of said rotary control member for communicating hydraulic pressure and flow to a group of cylinders in series in each hydraulic motor means while venting the rest of the cylinders in each hydraulic motor means to a return line, with rotation of said rotary control member sequencing pressurization for each hydraulic motor means by, in each hydraulic motor means, progressively adding a cylinder to the forward edge of the pressurized group of cylinders and removing a cylinder from the trailing edge of the pressurized group of cylinders, to in that manner deliver driving pulses of hydraulic pressure to the hydraulic motor means, with the pistons of each new group of pressurized cylinders functioning to drive the rotary output member into a new position or equilibrium and then hold it in such position until there is another change in the makeup of the pressurized group, and whereby an increment of rotary displacement of the rotary output member occurs in direct response to each electrical command pulse that is received by the electrical stepping motor.

2. An actuator according to claim 1, wherein the distributor valve means alternates driving pulses of hydraulic pressure and flow between the two axial piston hydraulic motors.

3. An actuator according to claim 1, wherein the electric stepping motor, the distributor valve means and the rotary output hydraulic motor are all reversible.

4. In an aircraft, a flight control surface; and means for actuating said flight control surface, comprising:

a rotary electrohydraulic incremental actuator, comprising:

an electric motor operable by electrical command pulses and including a rotary output shaft which rotates an angular increment in response to each electrical command pulse received by said electric stepping motor;

rotary output hydraulic motor means comprising a rotary output member and a plurality of cylinders, pistons within said cylinders, and means operable in response to sequenced pressurization of the cylinders and attendant piston movement, to apply rotational torque to said output member;

distributor valve means including a rotary control member connected to and rotated by the output shaft of the electric stepping motor, and port means controlled by rotation of said rotary control member for sequencing hydraulic pressure and flow to a group of said cylinders in series while venting the rest of said cylinders to a return line, with rotation of said rotary control member sequencing pressurization by progressively adding a cylinder to the forward edge of the pressurized group and removing a cylinder from the trailing edge of the pressurized group, to in that manner deliver driving pulses of hydraulic fluid to the rotary hydraulic motor means, with the pistons of each new group of pressurized cylinders functioning to rotate the output member into a position of equilibrium and then hold it in such position until another change in the makeup of the pressurized group, whereby a precise increment of rotary displacement of the output member of the rotary output hydraulic motor means occurs in direct response to each electrical command pulse that is received by the electric stepping motor; and drive transmission means drivenly connecting the output member to said flight control surface.

5. Apparatus according to claim 4, wherein the electric stepping motor, the distributor valve means and the rotary output hydraulic motor are all reversible.

6. Apparatus according to claim 4, wherein the rotary output hydraulic motor means comprises an axial piston motor having a fixed cylinder block in which the cylinders are in a ring surrounding a centerline which is parallel with the stroke of the pistons, and wherein said means for providing rotational torque to the output member comprises an output shaft with an axis of rotation that is coaxial with the cylinder block centerline and wobble plate connected to the output shaft, with the piston load bearing ends in contact with the wobble plate, whereby axial movement of the pistons will apply rotational torque to said wobble plate and said output shaft.

7. Apparatus according to claim 6, wherein the distributor valve means includes a housing which is connected to an end of the cylinder block, and wherein the port means are located within said housing and includes a combined inlet-outlet port for each cylinder.

8. Apparatus to claim 6, comprising a second axial piston motor of the character described in parallel with such first axial piston motor, and wherein the rotary output hydraulic motor means further comprises torque summing gearing means connecting the output shafts of such motors to said rotary output member.

9. Apparatus according to claim 8, wherein the distributor valve means alternates driving pulses of hydraulic fluid between the two axial piston hydraulic motors.

10. In a hydraulic servo system for an aircraft in which a digital command signal from an on board digital computer or microprocessor controls the sequencing of hydraulic pressure and flow to the individual cylinders of a rotary output hydraulic motor employed as an actuator, wherein said rotary output hydraulic motor comprises:

fixed housing means defining a plurality of axially elongated stationary cylinders, extending parallel to each other and to a center axis, and arranged in a ring about the center axis, each cylinder having a combined inlet-outlet port at a first end of the motor;

an axially reciprocating piston in each cylinder each piston including a fluid contacting end directed towards its cylinders inlet-outlet port and an opposite end portion which projects outwardly from its cylinder through the end thereof that is opposite said port;

a wobble plate contacting the projecting ends of the pistons, and shaft means connected to said wobble plate, supporting it from rotation about an axis coincident with the center axis; and digital command signal controlled sequencing valve means for sequencing hydraulic pressure and flow to and from the cylinders, independently of the position of said shaft means, by progressively adding a cylinder to the forward edge of a pressurized series group of said cylinders, and then removing a cylinder from the trailing edge of the group, will result in a step-by-step rotation of the wobble plate and the shaft means in direct response to digital command signals and a holding of such wobble plate and shaft means in a fixed position between command signals.

11. An incremental electrohydraulic actuator, comprising:

an electric stepping motor operable by electric command pulses and including a rotary output shaft which rotates an angular increment in response to each electrical command pulse received by said electric stepping motor;

a hydraulic power device comprising a wobble plate mounted for rotation, a plurality of stationary cylinders and pistons within said cylinders operable in response to sequenced pressurization of the cylinders to apply rotationl torque to said wobble plate; and distributor valve means including a rotary control member connected to and rotated by the output shaft of the electric stepping motor, and port means controlled by rotation of said rotary control member by sequencing hydraulic pressure and flow to a group of said cylinders in series while venting the rest of said cylinders, with rotation of said rotary control member sequencing pressurization by progressively adding a cylinder to the forward edge of the pressurized group and removing a cylinder from the trailing edge of the pressurized group, with the pistons of each new group functioning to rotate the wobble plate into position of equilibrium and then hold it in such position until another change in the makeup of the pressurized group, with rotational movement of the wobble plate extending the pistons of the vented cylinders and forcing hydraulic fluid out from said vented cylinders, whereby an increment of operation of the rotary hydraulic power unit occurs in direct response to each electrical command pulse that is received by the electric stepping motor;

an output member that moves in increments in response to the increments of operation of the rotary hydraulic power unit; and monitor means including means operable in response to a feedback signal from said output member to deliver corrective electrical pulses to the electric stepping motor to bring the input and output function into synchronization at the time of system start-up and to correct errors or missed steps for any reason.

12. An actuator according to claim 11, wherein said monitor means comprises a main position transducer and a standby position transducer, each operable when in use to produce said feedback signal, and means for switching from said main transducer to said standby transducer in the event of a malfunction of said main transducer.

13. An actuator according to claim 11, wherein said monitor means includes position transducer means for generating said feedback signal, and means operable in response to an error signal from said position transducer means, indicating failure of the position transducer means, to disable the means operable to produce corrective steps; whereby the actuator will operate open-loop.

14. An actuator according to claim 13, wherein said monitor means comprises means for rendering the disabling means inoperate during start-up.

15. An actuator according to claim 14, wherein said monitor means comprises a main position transducer and a standby position transducer, each operable when in use to produce said feedback signal, and means for switching from said main transducer to said standby transducer in the event of a malfunction of said main transducer.

* * * * *

UNITED STATES PATENT AND TRADEMARK OFFICE
CERTIFICATE OF CORRECTION

PATENT NO. : 4,426,911

DATED : January 24, 1984

INVENTOR(S) : Curtiss W. Robinson and Eugene T. Raymond

It is certified that error appears in the above-identified patent and that said Letters Patent are hereby corrected as shown below:

Column 9, line 49, "or" should be --of--.

Signed and Sealed this

*Fifteenth* Day of *May 1984*

[SEAL]

*Attest:*

GERALD J. MOSSINGHOFF

*Attesting Officer* *Commissioner of Patents and Trademarks*